Oct. 14, 1930.  J. H. STONE  1,778,404
CONTROLLING DEVICE FOR AWNINGS
Filed Sept. 14, 1928
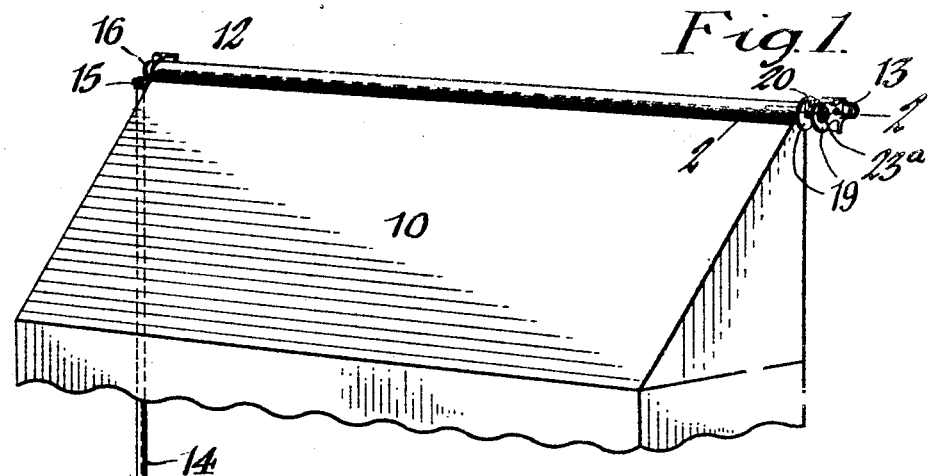
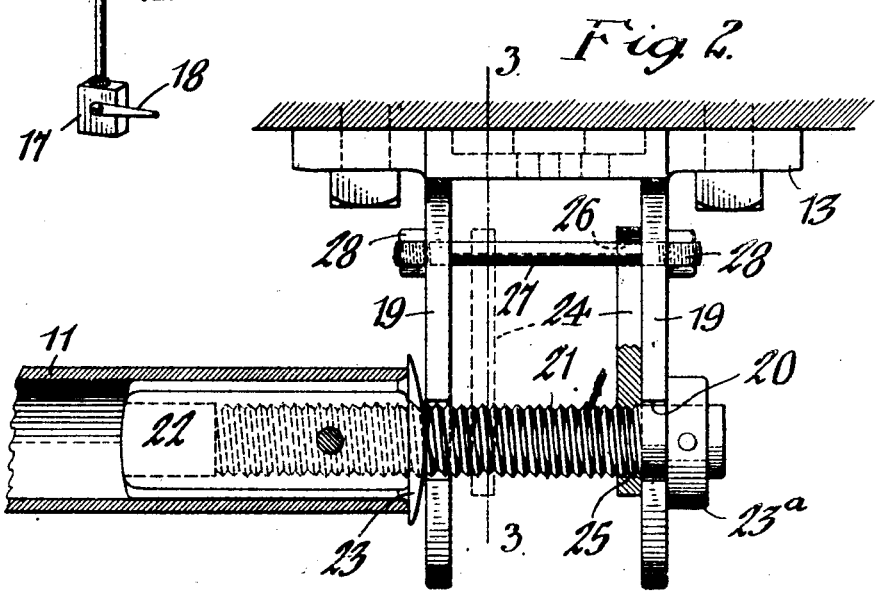
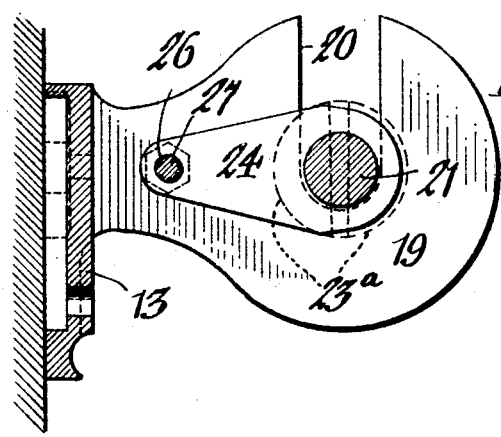
Inventor,
John H. Stone,
by Walter P. Geiger
Attorney.

Patented Oct. 14, 1930

1,778,404

UNITED STATES PATENT OFFICE

JOHN H. STONE, OF BUFFALO, NEW YORK

CONTROLLING DEVICE FOR AWNINGS

Application filed September 14, 1928. Serial No. 305,921.

This invention relates generally to awnings of the roller type and more particularly to improvements in the controlling or regulating devices thereof.

Its chief object is the provision of a controlling device of this character by which the unrolling of the awning can be positively arrested at any desired predetermined limit and whereby any looseness or objectionable sagging thereof is eliminated.

A further object of the invention is to provide a controlling device for awnings which is constructed to permit its ready installation and adjustment and which at the same time serves as a bearing for one end of the awning-roller.

In the accompanying drawings:—

Figure 1 is a perspective view of an awning equipped with my invention. Figure 2 is an enlarged horizontal section taken in the plane of line 2—2, Figure 1. Figure 3 is a transverse section taken on line 3—3, Figure 2.

Similar characters of reference indicate corresponding parts throughout the several views.

The improvement has been shown, by way of example, in connection with the ordinary roller type of awning, 10 indicating the fabric thereof and 11 the revolvable pole or roller to which one end of the fabric is secured for raising and lowering the awning. The roller, which may be made of wood or consist of a pipe, is supported at its ends in suitable brackets 12, 13, the bracket 13 shown at the right in Figure 1 also serving as a support for the improved controlling device.

The roller 11 may be turned by any appropriate means, but preferably by an upright shaft 14 having a bevel or worm gear 15 at its upper end meshing with a similar gear 16 on the adjacent end of the roller, and gearing (not shown) housed within the gear box 17 secured to the wall of the building at the lower end of said shaft, a hand lever 18 being provided for transmitting motion to the latter.

Extending forwardly from the base plate of the bracket 13 are a pair of parallel supporting lugs or flanges 19 spaced a suitable distance apart, as shown in Figure 2, and having upwardly opening recesses 20 therein for receiving an externally threaded pin or stem 21 which constitutes the journal for the right hand end of the awning-roller. This threaded stem may be pinned or otherwise secured to a plug 22 fitted in the end of the roller to turn therewith, so that as the handle 18 is turned in one direction or the other the roller and its threaded stem 21 are rotated in unison in a corresponding direction. The flanged end 23 of the plug bears at its outer side against the opposing face of the adjacent bracket flange 19 and a collar 23$^a$ is pinned to the outer end of the stem and bears at its inner side against the companion bracket-flange, whereby endwise displacement of the roller and its stem relative to the bracket is prevented.

Mounted on the threaded stem 21 to move lengthwise thereof as the awning is rolled up or down is an adjustable stop for limiting the unrolling of the awning to its lowered position, said stop being in the form of a nut-like member preferably consisting of a plate 24 having a threaded opening 25 at its outer end engaging the stem and a smooth-bored opening 26 at its inner end engaging a guide pin 27 disposed parallel to said stem and detachably mounted on the bracket-flanges 19 by nuts 28. The pin 27 holds the plate 24 against turning as the awning is rolled, and during such movement the plate travels along the threaded stem to the full line or dotted line position shown in Figure 2. The full line position shows the stop plate bearing against the right hand bracket-flange, the awning being unrolled to its predetermined lowered position and the plate locking the roller against further movement beyond that position. The dotted line position shows the location of the stop plate in the raised condition of the awning.

Briefly stated the operation of the device is as follows:—

Assume that the awning has been installed on the building and that the same has been lowered to the position desired, the pin 27 of the locking plate 24 having been previously withdrawn from engagement with the latter so as not to interfere with the free turning of the roller 11 to unwind the awning therefrom. After the predetermined lowered position of the awning is arrived at, the locking plate is turned on its threaded stem 21 until it strikes the right hand flange 19 of the bracket 13, after which the pin is inserted through the plate-opening 26 and securely fastened to the bracket by its nuts 28. When the awning is raised, the locking plate travels axially of its stem to the dotted line position thereof shown in Figure 2. When it is lowered, the locking plate travels in the opposite direction to the full line position shown in said figure, wherein further turning of the roller 11 to unwind the awning is prevented, thereby positively arresting the awning at the desired predetermined position and insuring its assuming that position whenever the awning is lowered. Should it be desired to adjust the awning to any other height, the same procedure is followed as above described.

In large awnings, it is customary to support the roller 11 in the center, as well as at the ends, to prevent it from sagging, and for such purposes the bearing bracket 13 containing the controlling device is employed as the center support. While the improved controlling device has been shown applied to one end of the awning, it is to be understood that it can be applied with equal facility to the other end, if desired, or to the center of the awning.

I claim as my invention:—

1. A device of the character described, comprising a roller provided at one end with an axially disposed screw stem, a double-walled bracket for supporting said screw stem against longitudinal movement, a guide pin applied to said bracket in parallel relation to the screw stem, and a stop plate arranged to travel between the walls of said bracket for controlling the movement of said roller, said plate having a threaded opening engageable with the screw stem and a smooth-bored opening engageable with said guide pin.

2. A combined bearing bracket and controlling device for roller awnings, comprising an attaching base having supporting flanges projecting therefrom, a threaded-stem adapted for connection to the awning-roller to turn therewith and supported on said flanges to turn freely therein, a stop element disposed for movement between said flanges and having a threaded opening engaging said threaded-stem, said stop element being governed by said roller for limiting the unrolling of the awning to a predetermined position, and a guide pin mounted on said flanges in parallel relation to said stem, the stop element having an opening therein slidingly engaging said guide pin to prevent its turning about the axis of the awning-roller.

JOHN H. STONE.